(12) United States Patent
Miyauchi

(10) Patent No.: US 6,844,879 B2
(45) Date of Patent: Jan. 18, 2005

(54) DRAWING APPARATUS

(75) Inventor: Yoshihito Miyauchi, Osaka (JP)

(73) Assignee: NEC Corporation, Tokyo (JP)

( * ) Notice: Subject to any disclaimer, the term of this patent is extended or adjusted under 35 U.S.C. 154(b) by 218 days.

(21) Appl. No.: 10/195,761

(22) Filed: Jul. 16, 2002

(65) Prior Publication Data
US 2003/0016223 A1 Jan. 23, 2003

(30) Foreign Application Priority Data
Jul. 19, 2001 (JP) ........................................ 2001-219498

(51) Int. Cl.$^7$ .............................................. G06F 15/16
(52) U.S. Cl. ...................... 345/502; 345/504; 345/505; 345/506; 345/522
(58) Field of Search ................................ 345/505, 504, 345/506, 522, 531, 539, 502

(56) References Cited

U.S. PATENT DOCUMENTS

| 5,485,559 A | * | 1/1996 | Sakaibara et al. .......... 345/505 |
| 6,046,709 A | | 4/2000 | Shelton et al. |
| 6,078,339 A | * | 6/2000 | Meinerth et al. ........... 345/522 |
| 6,157,395 A | | 12/2000 | Alcorn |
| 6,690,379 B2 | * | 2/2004 | Margulis ..................... 345/535 |

FOREIGN PATENT DOCUMENTS

EP   1 037 164 A2   9/2000

* cited by examiner

Primary Examiner—Matthew C. Bella
Assistant Examiner—Mackly Monestime
(74) Attorney, Agent, or Firm—Sughrue Mion, PLLC

(57) ABSTRACT

A drawing apparatus of the present invention includes: a display element on which images are displayed; and a plurality of loosely coupled drawing elements each of which executes drawing processing in parallel. At an update time predetermined for a display screen of the display element, each of the drawing elements updates the display screen only if none of the drawing elements is executing drawing processing. A parallel drawing method of the present invention executed by a plurality of drawing elements, each of which executes drawing processing, includes: receiving a drawing instruction; and updating the display screen of the display element by each of the drawing elements only if none of the drawing elements is executing drawing processing at an update time predetermined for the display screen.

17 Claims, 8 Drawing Sheets

DRAWING APPARATUS

BACKGROUND OF THE INVENTION

The present invention relates to a drawing apparatus that repeatedly updates the screen on which motion pictures such as animations using computer graphics are displayed, and more particularly to a drawing apparatus, a parallel drawing method, and a parallel drawing program which distribute sequential frame generation tasks to a plurality of drawing processors and make them generate frames in parallel.

On an apparatus that draws and displays one screen at a time, especially, on an apparatus that displays 3-D graphics animations, the display switching speed slows down as the amount of drawing data increases or as the resolution becomes higher and the number of pixels of a drawing object increases. Conventionally, several technologies have been used to solve this problem. For example, pipeline processing is performed, the screen is split into multiple areas, or parallel processing is performed with drawing data divided in order to increase the speed.

As described above, the problem with the conventional technology is that the display switching speed slows down as the amount of drawing data increases or as the resolution becomes higher and the number of pixels of a drawing object increases.

In addition, the conventional technologies for solving this problem, for example, by performing pipeline processing, by splitting the screen into multiple areas, or by performing parallel processing with drawing data divided have a problem that the processing steps are tightly coupled and therefore extensibility is limited.

SUMMARY OF THE INVENTION

It is an object of the present invention to provide a drawing apparatus that uses loosely coupled drawing processors not sharing the memory to perform parallel screen drawing, a parallel drawing method, and a parallel drawing program.

It is another object of the present invention to provide a simply configured drawing apparatus that achieves the first object wherein a signal line indicating that one of drawing processors is in the drawing operation and a signal line indicating display synchronization among drawing processors are newly provided.

According to one aspect of the present invention, a drawing apparatus is provided which includes: a display element on which images are displayed; and a plurality of loosely coupled drawing elements each of which executes drawing processing in parallel; wherein, at an update time predetermined for a display screen of the display element, each of the drawing elements updates the display screen only if none of the drawing elements is executing drawing processing.

According to another aspect of the present invention, a method executed by a plurality of drawing elements, each of which executes drawing processing, is provided which includes: receiving a drawing instruction; and updating the display screen of the display element by each of the drawing elements only if none of the drawing elements is executing drawing processing at an update time predetermined for the display screen.

According to another aspect of the present invention, a computer-usable storage medium having a computer program embodied thereon for causing a computer, which includes a plurality of drawing elements, each of which executes drawing processing, by performing the following steps when such program is executed on the computer: receiving a drawing instruction; and updating the display screen of the display element by each of the drawing elements only if none of the drawing elements is executing drawing processing at an update time predetermined for the display screen.

BRIEF DESCRIPTION OF THE DRAWINGS

Other features and advantages of the invention will be made more apparent by the following detailed description and the accompanying drawings, wherein.

In the drawings, the same reference numerals represent the same structural elements.

DETAILED DESCRIPTION OF THE PREFERRED EMBODIMENTS

Figure 1:
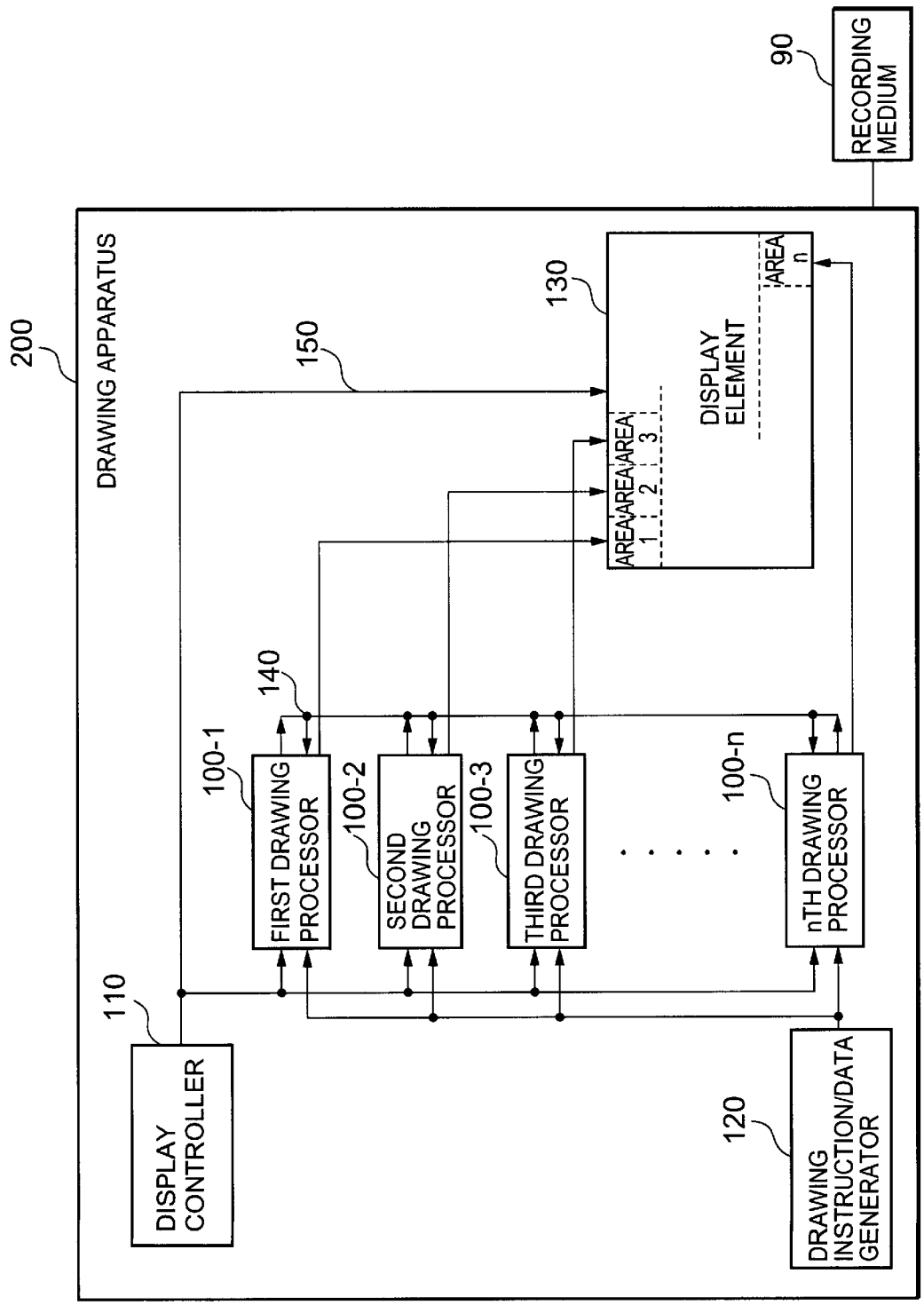
FIG. 1 is a block diagram showing the configuration of a drawing apparatus in a first embodiment of the present invention.

A first embodiment of the present invention will be described in detail below.

A drawing apparatus (parallel drawing apparatus, parallel synchronous drawing apparatus) according to the present invention includes a processor that repeatedly updates frames, such as the animation display frame where computer graphics are used, wherein the generation of the frame, which is generated sequentially by synchronizing drawing among a plurality of loosely coupled drawing processors, is distributed to a plurality of drawing processors in order to generate the frame in parallel. This configuration increases the overall drawing processing power.

The drawing apparatus according to the present invention is a simply-configured apparatus in which two signal lines, one indicating at least one of a plurality of drawing processors is in the drawing operation and the other indicating display synchronization time among drawing processors, are used to synchronize drawing.

Referring to FIG. 1, a drawing apparatus 200 in the embodiment is a computer graphics display device that draws a high-resolution screen speedily. To do so, a plurality of display devices (areas 1, 2, 3, . . . , n displayed in a display element 130) are arranged to form the display element 130 with drawing processors (first, second, third, . . . nth drawing processor 100-1, . . . , 100-n) assigned to the screens (areas 1, 2, 3, . . . , n), one to each, to allow the drawing processors to perform drawing in parallel.

The drawing apparatus 200 includes a plurality (n) of loosely coupled drawing processors 100-1 to 100-n, a display controller 110, a drawing instruction/data generator 120, the display element 130, a drawing busy signal line 140, and a display synchronizing signal line 150.

The display controller 110 generates the display synchronizing signal that notifies the apparatus-wide display time via the display synchronizing signal line 150. For example, the vertical synchronization signal may be used as the display synchronizing signal. The drawing instruction/data generator 120 generates drawing instructions and data used for the initialization of computer graphics resources and for drawing.

N drawing processors 100-1 to 100-n, each with the same function, receive drawing instructions and data from the drawing instruction/data generator 120, draw data in the corresponding areas in the display element 130, and retain the drawing contents. In response to the display synchronizing signal, which notifies the update of the display time, from the display controller 110, the drawing processors 100-1 to 100-n update the display screen.

The drawing busy signal is sent through the drawing busy signal line 140, indicating that at least one of the drawing processors, 100-1 to 100-n, is in drawing operation. The display synchronizing signal received from the display controller 110 is sent through the display synchronizing signal line 150. The display element 130 is composed of the areas (1, 2, 3, . . . , n) in each of which the corresponding one of the drawing processors, 100-1 to 100-n, draw and display data.

The drawing instructions and data on screen splitting are controlled as described below when drawing data in the split screen. One way is that the drawing instruction/data generator 120 individually gives each of drawing processors, 100-1 to 100-n, the corresponding drawing instruction and data for its area and each of the drawing processors draw the corresponding data in the corresponding area. Another way is that the drawing instruction/data generator 120 gives all drawing processors, 100-1 to 100-n, all drawing instructions and data at the same time and each of the drawing processors, 100-1 to 100-n, extracts only its own area and draw data therein.

Figure 2:
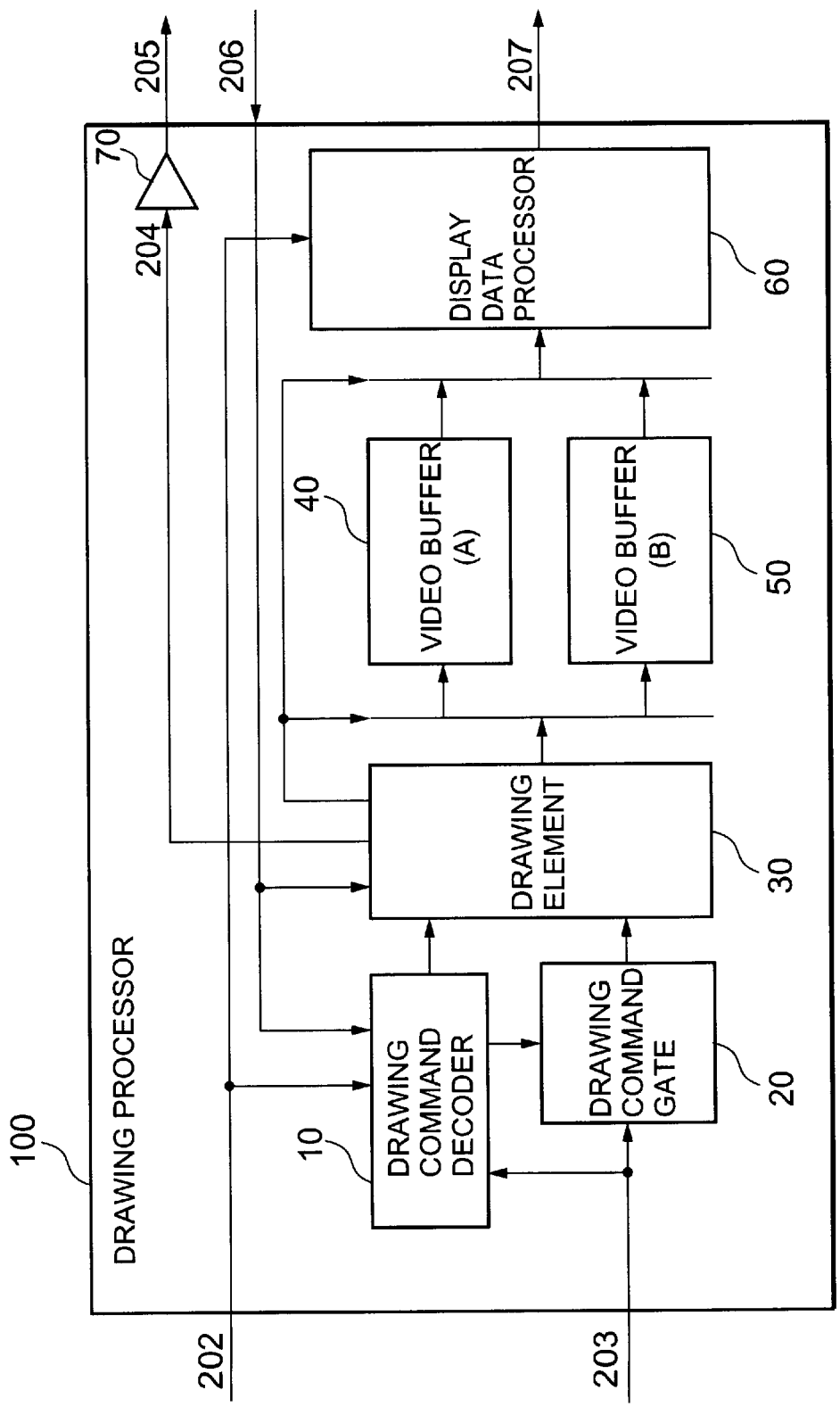
FIG. 2 is a block diagram showing the configuration of a drawing processor in the first embodiment of the present invention.

Referring to FIG. 2, one example of the drawing processor 100 in the embodiment is shown. The processor 100 includes a drawing command decoder 10, a drawing command gate 20, a drawing element 30, a video buffer A 40, a video buffer B 50, a display data processor 60, and a device 70. The device 70 outputs the drawing busy signal. FIG. 2 shows the detailed configuration of the drawing processor 100 that is one of drawing processors, 100-1 to 100-n, shown in FIG. 1. The configuration and the function are common to the drawing processors 100-1 to 100-n.

Information that is input to the drawing processor 100, shown in FIG. 2, includes a display synchronizing signal 202, which indicates a time at which the display frame is to be displayed, a drawing instruction/data input 203 for use in drawing, and a drawing busy input signal 206, which indicates that at least one of the plurality of drawing processors is in the drawing operation. Signals that are output from the drawing processor 100, shown in FIG. 2, include a drawing busy output signal 205, which indicates that the drawing processor 100 is in the drawing operation and display data 207, which is output in synchronization with the display synchronizing signal 202.

The drawing busy input signal 206 and the drawing busy output signal 205 are wired-OR connected with every drawing processor. The drawing busy output signal 205 comes from a drawing busy signal 204 in the drawing processor 100 via the device 70 which has wired-OR connectivity, such as an open drain, thus the drawing busy signal 204 is in a form that may be wired-ORed.

Next, the operation of this embodiment will be described.

The drawing processor 100 in this embodiment is a double-buffered graphics drawing processor, and has two internal video buffers (video buffer A 40 and video buffer B 50) each equal to the display area in size. In the drawing processor 100, while one video buffer is used for the drawing operation, the contents of the other video buffer are displayed on the display element 130. The roles of the video buffers 40 and 50 alternate. A display screen switching instruction, input through the drawing instruction/data input 203, causes data to be displayed from the video buffer, which has been used for the drawing operation and, conversely, data to be drawn into the video buffer, which has been used for display.

In addition, the video buffers for display in the drawing processor 100 in this embodiment are switched when the display frame of the display device is updated. For example, when the drawing processor is used for display on a raster scan display, the vertical synchronization signal is used as the display synchronizing signal 202 and the video buffers for display are switched at the blanking time of the vertical synchronization signal. Switching the video buffers for display at the blanking time of the vertical synchronization signal is typically used to prevent the display from being disturbed.

The drawing and display operations of the drawing processor 100 in this embodiment will be described below more in detail.

Drawing instructions and data are input from the drawing instruction/data input 203 into the drawing unit 30 via the drawing command gate 20. The drawing unit 30 draws data in the video buffer (A 40 or B 50) currently specified for drawing.

The video buffer (A 40 or B 50) not specified for drawing is specified exclusively for display. Display data is read from the video buffer (A 40 or B 50) specified for display in synchronization with the display synchronizing signal 202, converted by the display data processor 60 to data/signals display-able on the display element, and then output as the display data 207.

The drawing command decoder 10 monitors drawing instructions and data received from the drawing instruction/data input 203. When the display screen switching instruction is input via the drawing instruction/data input 203, the drawing command gate 20 holds the display screen switching instruction and the following drawing instructions and data.

When the display synchronizing signal 202 indicates a display switching time, the drawing command decoder 10 checks state of the drawing busy input signal 206. If it is found none of drawing processors is executing the drawing operation, the drawing command decoder 10 permits the drawing instructions and data, which have been held by the drawing command gate 20, to be passed to the drawing unit 30. From the moment screen drawing is started to the moment the display screen switching instruction is detected by the drawing command decoder 10, the drawing unit 30 turns on the drawing busy signal 204 to indicate that the processor is executing the drawing operation.

On the other hand, after the drawing command decoder 10 checks the drawing busy input signal 206 when the display synchronizing signal 202 indicates a display switching time, if the signal indicates that at least one of drawing processors is executing the drawing operation, the drawing commands and data are kept held in the drawing command gate 20. The check by the drawing command decoder 10 is made again at the next display switching time. This state continues until it is found that none of the drawing processors is executing the drawing operation.

When the display screen switching instruction is sent from the drawing command gate 20 to the drawing unit 30, the drawing unit 30 switches the video buffer (A 40 or B 50) for drawing to the other video buffer that has not been used for drawing. At the same time, the video buffer for display, which is mutually exclusive to the video buffer for drawing, is switched to the other buffer. For example, when the drawing unit 30 receives the display screen switching instruction when the video buffer A 40 is used for drawing and when display data for the display element 130 is read from the video buffer B 50, the video buffers are switched, that is, the video buffer B 50 is used for drawing and display data for the display element 130 is read from the video buffer A 40.

Figure 3:
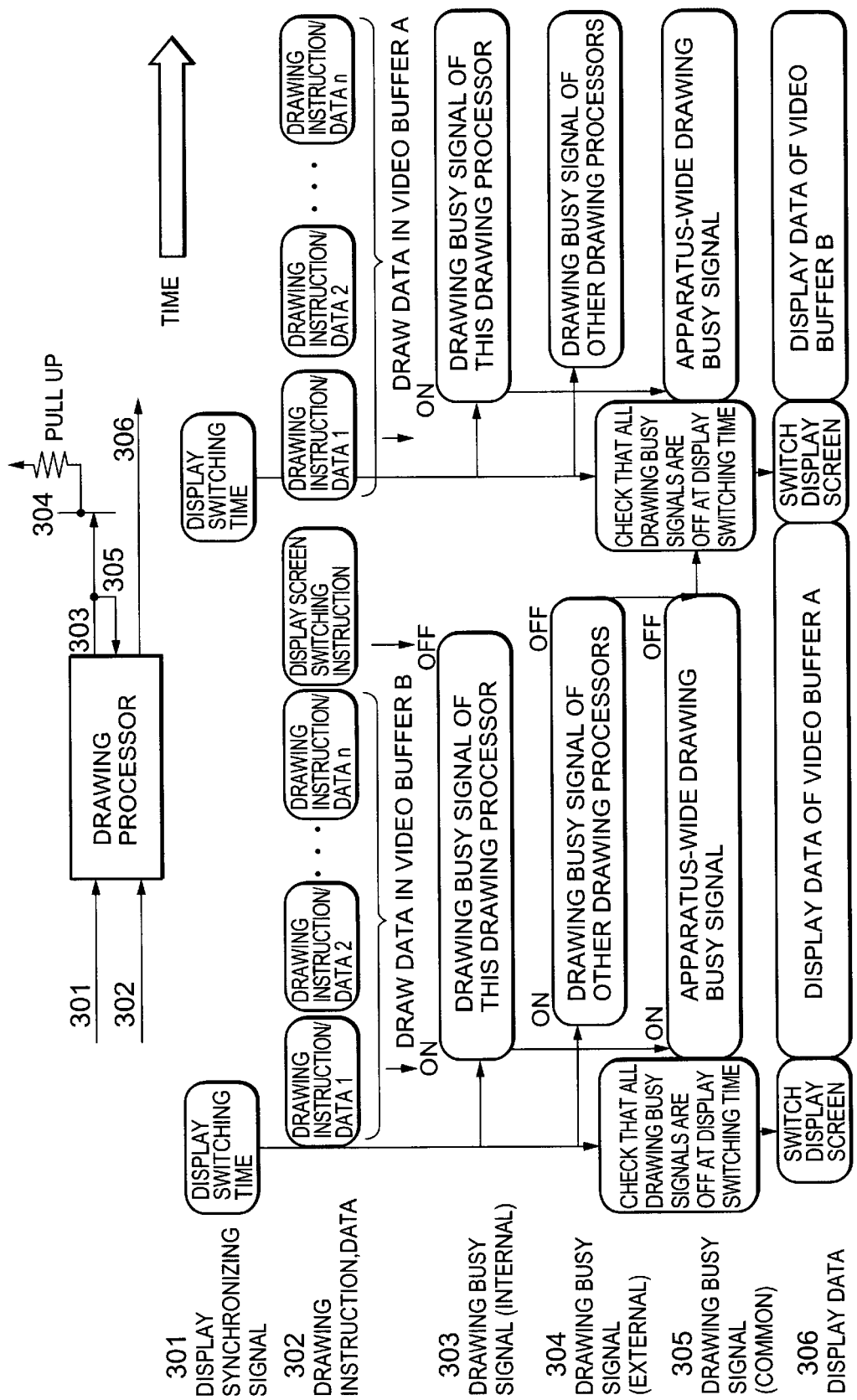
FIG. 3 is a diagram showing one example of drawing processing in the first embodiment of the present invention.

Next, the flow of processing of the drawing processor in an example in the embodiment, shown in FIG. 3, will be described.

First, from the time a display synchronizing signal 301 indicates a display switching time, "drawing instruction/data 1", "drawing instruction/data 2", . . . , "drawing instruction/data n" are input from a drawing instruction/data signal line 302 to a drawing processor 303, which is one of the above described drawing processors. The drawing processor 303 draws the data for its own territory out of them in the corresponding video buffers A or B. The display screen switching instruction is input as the last instruction of one-frame drawing operation through the drawing instruction/data signal line 302. An internal drawing busy signal 303 is turned on after "drawing instruction/data 1" is input, and is turned off by the display screen switching instruction. A common drawing busy signal 305 is a signal generated by wired-OR of the internal drawing busy signal 303 and the drawing busy signal 304 output by the other drawing processors.

Figure 5:
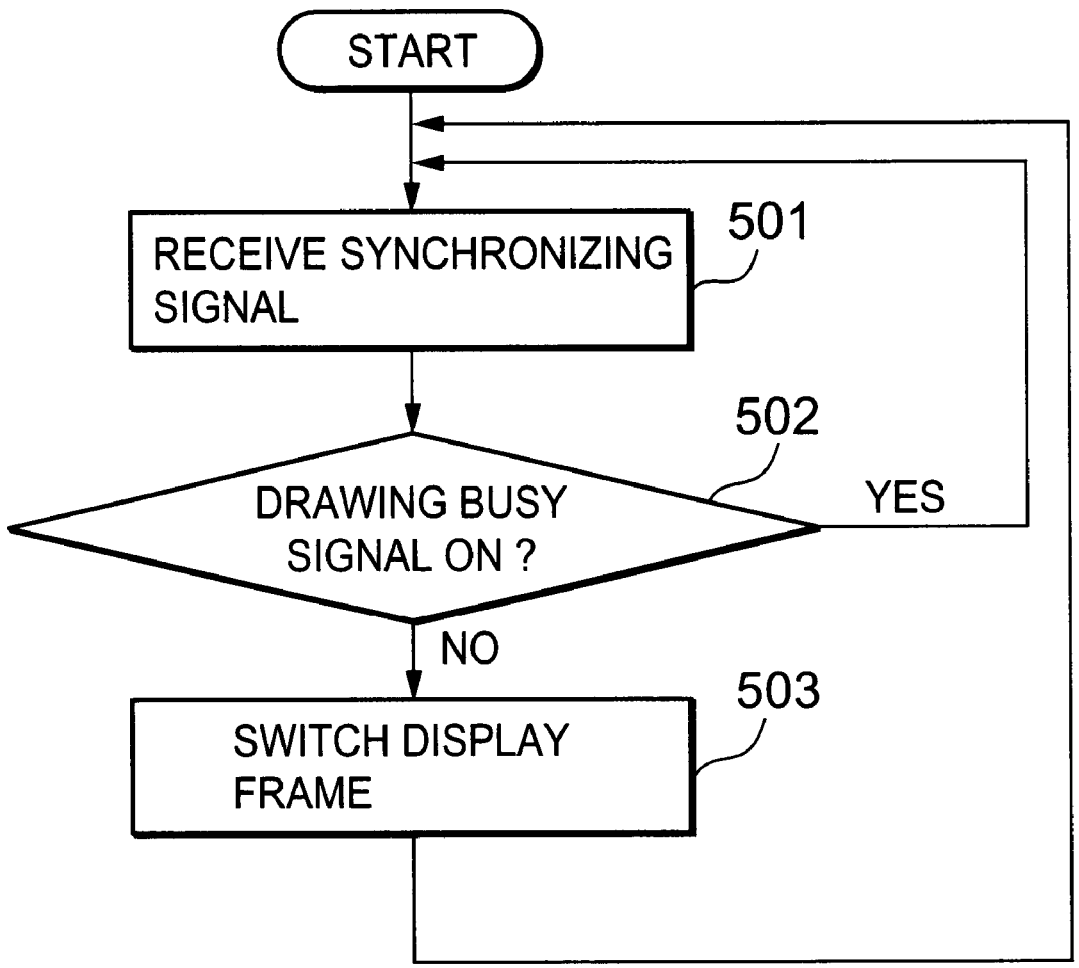
FIG. 5 is a flowchart showing the update processing of a display screen in the first embodiment of the present invention.

FIG. 5 is a flowchart showing the outline of display screen update processing. As shown in this flowchart and FIG. 3, a check is made, at the next display switching time (step 501) after starting drawing, whether or not the common drawing busy signal 305 is on (step 502). At this time, if the common drawing busy signal 305 is off, the display screen is switched (step 503).

Figure 4:
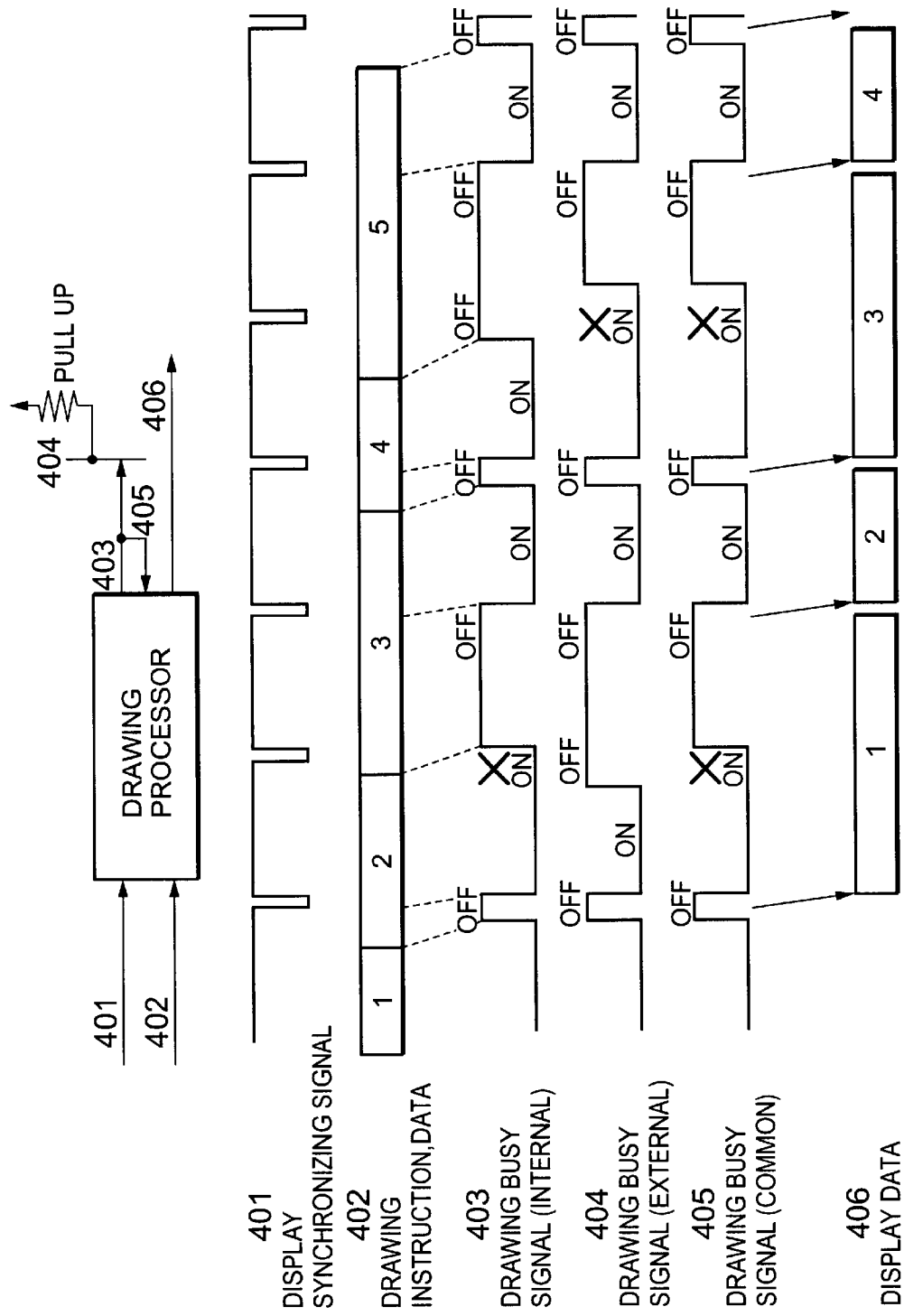
FIG. 4 is a diagram showing one example of drawing processing in the first embodiment of the present invention.

The example shown in FIG. 4 illustrates a case in which the drawing of one frame of data cannot be completed drawn before the display is switched. Noted that a time scale of the charts shown in FIG. 3 and FIG. 4 varies, and a cluster of the drawing instructions/data shown in FIG. 3 and FIG. 4 also varies. For example, the drawing instruction/data shown in FIG. 3 and FIG. 4 correspond to the divided territory for each drawing processor and to the whole frame, respectively. Referring to FIG. 4, the drawing of "2" of drawing instruction/data 402 cannot be completed internally with the result that the screen of "1" is displayed for two display cycles. Similarly, the drawing of "4" of drawing instruction/data 402 cannot be completed externally with the result that the screen of "3" is displayed for two display cycles. In sum, even though the drawing of one frame of data cannot be completed drawn before the display is switched, the synchronization of the drawing processors does not be disturbed.

As described above, the drawing apparatus 200 in this embodiment includes a plurality of loosely coupled drawing processors 100 each of which executes drawing processing. The apparatus 200 has a simple configuration in which the drawing processors 100 are simply interconnected by the display synchronizing signal line 150 and the drawing-status indication signal line 140 to synchronize drawing among the drawing processors 100. This allows the drawing apparatus 200 to operate the plurality of drawing processors 100 in parallel, as a result, it is easy to increase the overall system performance and it is possible to build a high-scalability system.

Next, a second embodiment of the present invention will be described in detail. In the second embodiment of the present invention, the parallel drawing apparatus according to the present invention is used in a stereo display device or in a three-dimensional display device. A stereo display device must display an image for the right eye and an image for the left eye. In general, one drawing processor alternately draws images for the right eye and images for the left eye with a predetermined time interval between them and the user views the images by using a pair of glasses with shutters such as liquid crystal shutters, or one drawing processor displays two frames at a time to allow the user to view the images with the left and right eyes via a polarizing or color filter.

Figure 6:
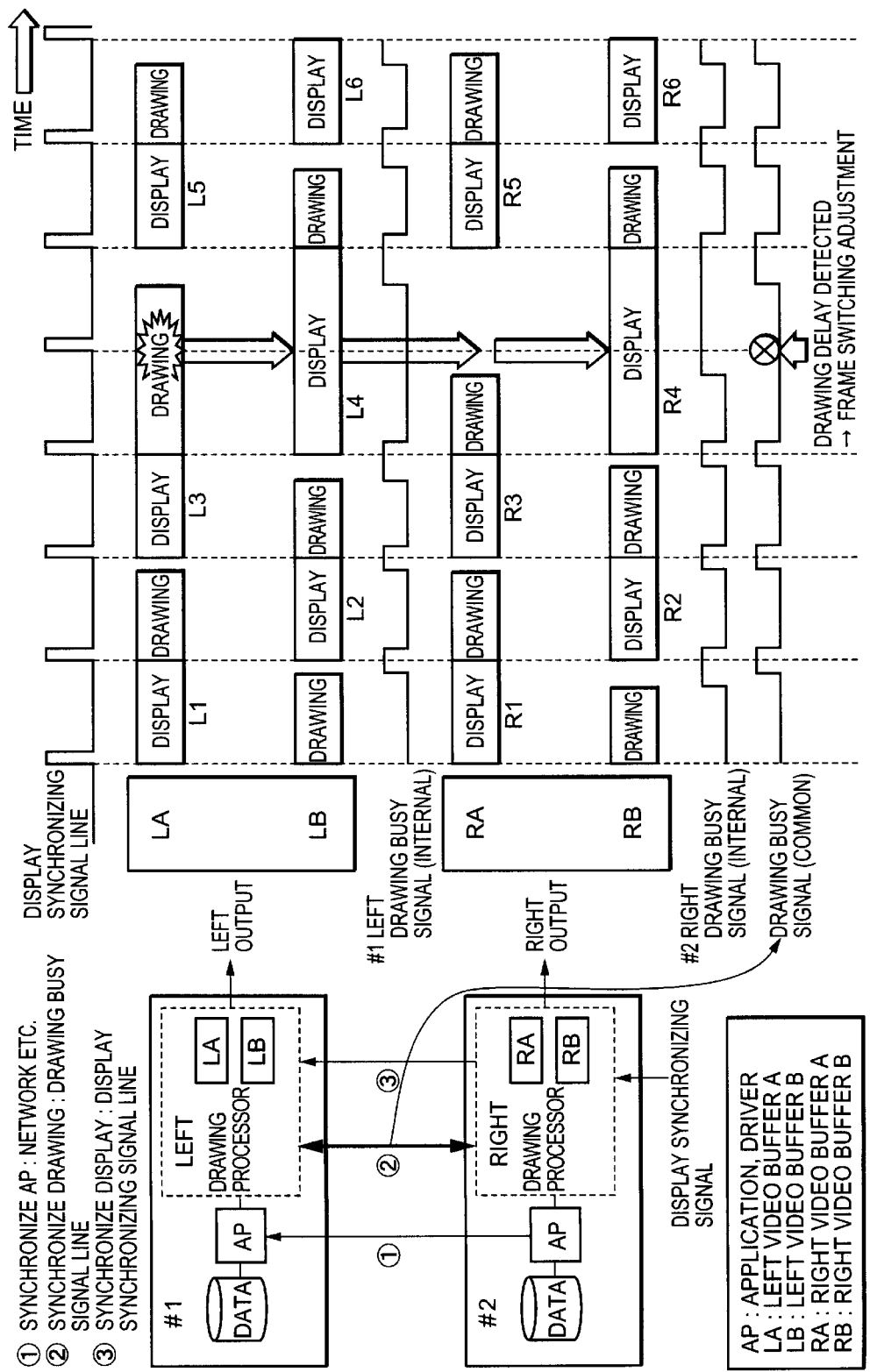
FIG. 6 is a diagram showing one example of drawing processing in a second embodiment of the present invention.

As in the first embodiment, the function of the parallel drawing apparatus according to the present invention may be used to make the two drawing processors draw the same number of pictures by synchronizing the program operations of the applications executed in the two drawing processors via the communication line as shown in FIG. 6. This makes it possible the synchronized drawing of the operation even after the program. Although performance is decreased by half when one drawing processor draws pictures for both the left and right eyes in the conventional way, the performance can be maintained in this embodiment.

Next, a third embodiment of the present invention will be described in detail.

Figure 7:
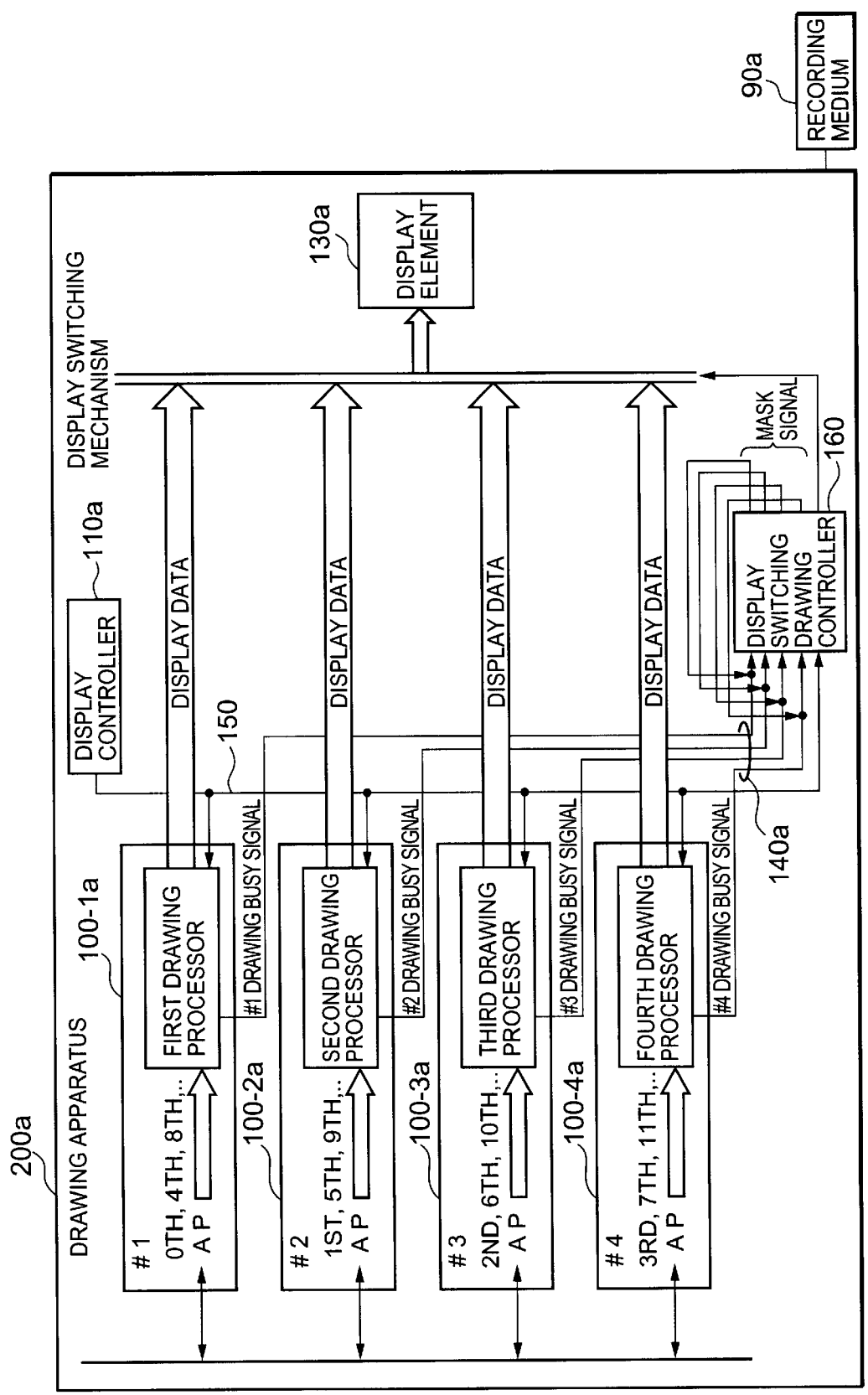
FIG. 7 is a block diagram showing the configuration of a drawing apparatus in a third embodiment of the present invention.
Figure 8:
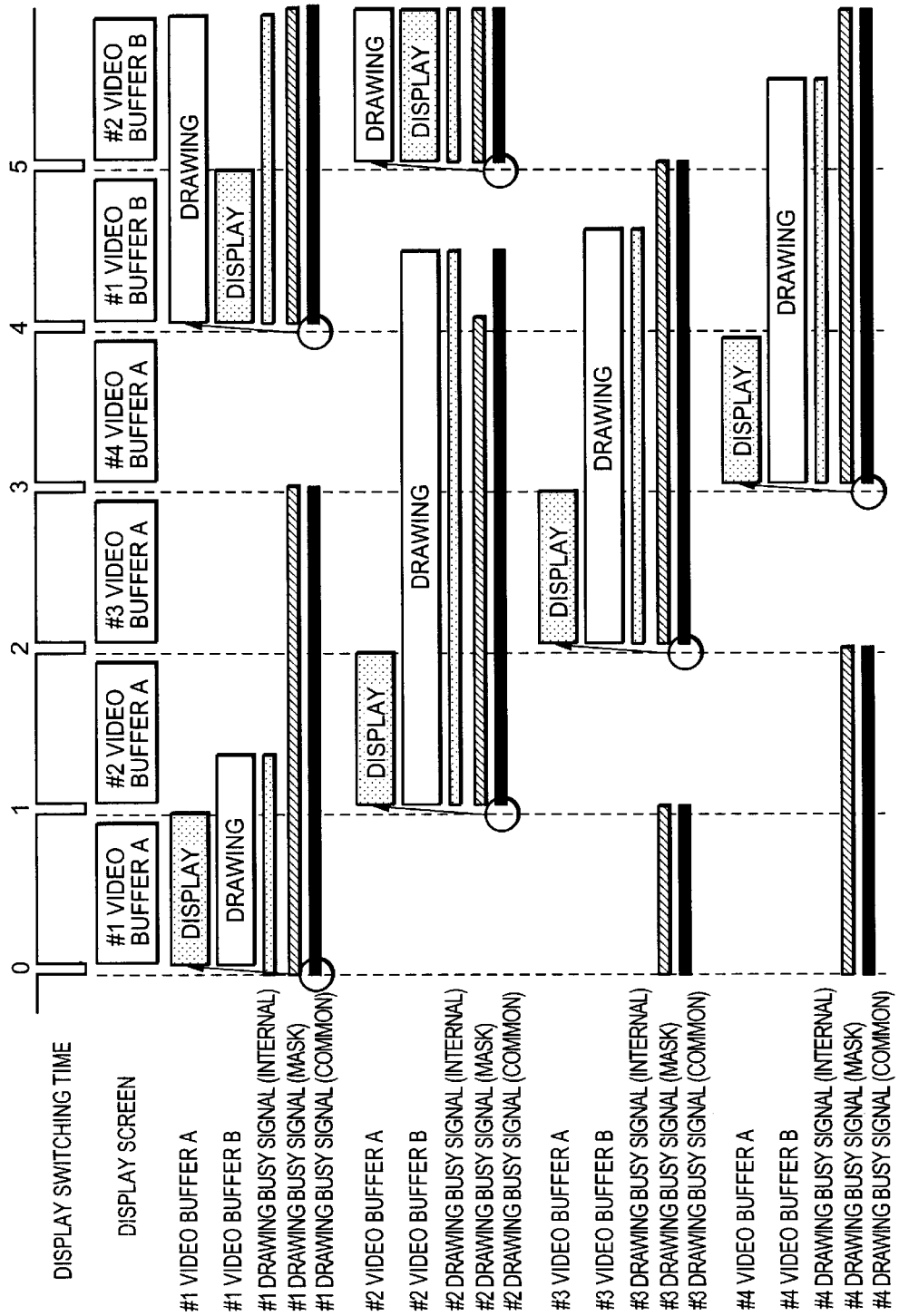
FIG. 8 is a diagram showing one example of drawing processing in the third embodiment of the present invention.

FIG. 7 is a block diagram showing the configuration of a drawing apparatus 200a in the third embodiment of the present invention, and FIG. 8 is a diagram showing one example of drawing processing in the embodiment. In the third embodiment, a plurality of drawing processors are used to increase drawing processing performance.

In this embodiment, four drawing processors 100-1a, . . . , 100-4a are used, as shown in FIG. 7, to switch all the display frames, #1, #2, #3, #4, #1, . . . , to quadruple drawing performance. For use in this switching processing, the drawing apparatus 200a in this embodiment further comprises a display switching drawing controller 160 which controls display frame switching performed by the drawing processors 100-1a, . . . , 100-4a.

In this embodiment, the applications stored in the drawing processors 100-1a, . . . , 100-4a exchange information over the network to allow the drawing processors to draw every fourth picture. That is, the drawing processor 100-1a, indicated by #1, draws every fourth picture beginning with the 0th picture, that is, the 0th, fourth, eighth, and so on. The drawing processor 100-2a, indicated by #2, draws every fourth picture beginning with the first picture, that is, the first, fifth, ninth, and so on. The drawing processor 100-3a, indicated by #3, draws every fourth picture beginning with the second picture, that is, second, sixth, tenth, and soon. The drawing processor 100-4a, indicated by #4, draws every fourth picture beginning with the third picture, that is, the third, seventh, eleventh, and so on.

The display switching drawing controller 160 checks the drawing busy signals of the drawing processors 100-1a, ..., 100-4a and the display switching sequence #1, #2, #3 and #4 to output the display switching time mask signals for each of the drawing busy signals, and checks the display switching time mask signals and the drawing status indication signals to switch the display data of #1, #2, #3, and #4 and to control the drawing and display switching of the drawing, processors 100-1a, . . . , 100-4a. For this reason, in this embodiment, the display switching drawing controller 160 integrally controls the drawing busy signals generated by the drawing processors 100-1a, . . . , 100-4a via drawing busy signal lines 140a.

The operation of the embodiment will be described more in detail with reference to FIG. 8. In FIG. 8, it is assumed that, in the initial state, video buffer A is displayed and data is drawn in video buffer B in the drawing processor 100-1a indicated by #1.

From display switching time 0 to 1, the video buffer A of #1 is displayed and, at display switch time 1, the video buffer is switched to the video buffer A of #2. Data may be drawn in the buffer from display switching time 0 to a point immediately before display switching time 4. During that period, the next screen cannot be drawn.

In the example shown in FIG. 8, the drawing operation in #1 ends at a point between display switching time 1 and 2. To prevent the drawing operation from being switched to the next frame at display switching time 2, the display switching drawing controller 160 issues the mask signal to the drawing busy signal of #1 during the period from the display switching time 0 to the display switching time 3. For #2, #3, and #4, the controller 160 also issues the mask signals to the drawing busy signals, one mask signal in each display period, to control drawing switching.

If one of drawing processors does not end drawing within four display periods, the display switching drawing controller 160 makes adjustment by not switching the display but by further prolonging the mask period to delay the entire operation.

As described above, in this embodiment if the drawing of one frame requires a plurality of cycles of display switching time periods, it is possible to draw and display a frame in every cycles by combining the drawing processors 100-1a, . . . , 100-4a , . . . corresponding to the number of required cycles.

It should be noted that any combination of the above embodiments is possible. For example, the first embodiment and the third embodiment may be combined. In this case, a plurality of areas are provided in the display element 130 and the display of one area may be sequentially switched by a plurality of drawing processors.

The display switching function and other functions of each drawing processor 100 of the drawing apparatus 200 or 200a used in the above embodiments may be implemented not only by hardware but also by a column drawing program, which is a computer program having the above-described functions, into the memory of a computer processor. This column drawing program is stored in a magnetic disk, semiconductor memory, and other recording media 90 and 90a. The functions described above are implemented by loading the program from the recording medium into the computer processor to control the operation of the computer processor.

Sub areas 1, 2, . . . , n of the display area of the display element 130 have a rectangular shape, for example, 1 dot×1 dots (1 is maximum column dots number of the display area of the display element 130 and n may be 1), m dots (m is maximum row dots number of the display area of the display element 130 n may be m)×1 dot, or j dots (j satisfies 1<j≦m)×k (k satisfies 1<k≦1)dots, having 1/n area of the display area of the display element 130.

As described above, the drawing apparatus according to the present invention includes a plurality of loosely coupled drawing processors each executing drawing processing. The apparatus has a simple configuration with the drawing processors simply interconnected by the display synchronizing signal line and the drawing-status indication signal line to synchronize drawing among the drawing processors.

This configuration allows the drawing apparatus to process the plurality of loosely coupled drawing processors in parallel, easily increasing the overall system performance and making it possible to build a high-scalability system.

While this invention has been described in conjunction with the preferred embodiments described above, it will now be possible for those skilled in the art to put this invention into practice in various other manners.

What is claimed is:

1. A drawing apparatus comprising: a display element on which images are displayed;
   a plurality of loosely coupled drawing elements each of which executes drawing processing in parallel; and
   a display controller which outputs a display synchronizing signal notifying each of said drawing elements of a synchronization time at which the display screen is updated,
   wherein, at an update time predetermined for a display screen of said display element, said display controller outputs said display synchronizing signal only if none of said drawing elements is executing drawing processing at an update time predetermined for a display screen of said display element, and each of said drawing elements updates the display screen based on said display synchronizing signal.

2. The drawing apparatus as claimed in claim 1, wherein each of said drawing elements issues a drawing busy signal, which indicates that the corresponding drawing element is executing drawing processing, to said drawing elements during execution of drawing processing, and finds in response to the drawing busy signal that at least one of said drawing elements is executing drawing processing.

3. The drawing apparatus as claimed in claim 1, wherein each said drawing element comprises a drawing command gate that blocks an input of drawing instructions and data if at least one of said drawing elements is executing drawing processing.

4. The drawing apparatus as claimed in claim 1, wherein the display area of said display element has a plurality of sub areas which corresponds to said drawing elements, respectively.

5. The drawing apparatus as claimed in claim 1, further comprising a display switching drawing controller which individually controls an execution of display frame switch of said each drawing element and make said each of drawing elements repeatedly and sequentially switch to display on said display element based on a predetermined sequence.

6. A parallel drawing method executed by a plurality of drawing elements, each of which executes drawing processing, comprising:
   receiving a drawing instruction;
   outputting a display synchronizing signal notifying each of said drawing elements of a synchronization time at which a display screen is updated, only if none of said drawing elements is executing drawing processing at an update time predetermined for said display screen; and updating the display screen of said display element by each of said drawing elements based on said display synchronizing signal.

7. The parallel drawing method as claimed in claim 6, further comprising: issuing, by each said drawing element, a drawing busy signal, which indicates that the corresponding drawing element is executing drawing processing, to said drawing elements during execution of drawing processing; and finding, by each said drawing element, in response to the drawing busy signal that at least one of said drawing elements is executing drawing processing.

8. The parallel drawing method as claimed in claim 6, further comprising blocking, by each said drawing element, an input of drawing instructions and data if at least one of said drawing elements is executing drawing processing.

9. The parallel drawing method as claimed in claim 6, wherein the display area of said display element has a plurality of sub areas which corresponds to said drawing elements, respectively.

10. The parallel drawing method as claimed in claim 6, further comprising individually controlling an execution of display frame switch of said each drawing element, and making said each of drawing elements repeatedly and sequentially switch to display on said display element based on a predetermined sequence.

11. A computer-usable storage medium having a computer program embodied thereon for causing a computer, which includes a plurality of drawing elements, each of which executes drawing processing, by performing the following steps when such program is executed on the computer:

receiving a drawing instruction;

outputting a display synchronizing signal notifying each of said drawing elements of a synchronization time at which a display screen is updated, only if none of said drawing elements is executing drawing processing at an update time predetermined for said display screen; and updating the display screen of said display element by each of said drawing elements based on display synchronizing signal.

12. The computer-usable storage medium having a computer program as claimed in claim 11, further comprising:

issuing, by each said drawing element, a drawing busy signal, which indicates that the corresponding drawing element is executing drawing processing, to said drawing elements during execution of drawing processing; and finding, by each said drawing element, in response to the drawing busy signal that at least one of said drawing elements is executing drawing processing.

13. The computer-usable storage medium having a computer program as claimed in claim 11, further comprising: blocking, by each said drawing element, an input of drawing instructions and data if at least one of said drawing elements is executing drawing processing.

14. The computer-usable storage medium having a computer program as claimed in claim 11, further comprising:

individually controlling an execution of display frame switch of said each drawing element, and making said each of drawing elements repeatedly and sequentially switch to display on said display element based on a predetermined sequence.

15. A drawing apparatus comprising:

a display element on which images are displayed, and a plurality of loosely coupled drawing elements each of which executes drawing processes in parallel;

wherein, at an update time predetermined for a display screen of said display element, each of said drawing elements updates the display screen only if none of said drawing elements is executing drawing processing, wherein each said drawing element comprises a first and second video buffers, therein first image data, which has been accumulated, is displayed on said display element from said first video buffer while second image data is being accumulated in said second video buffer, and wherein said second image data is displayed on said display element from said second video buffer while third image data is being accumulated in said first video buffer.

16. A parallel drawing method executed by a plurality of drawing elements, each of which executes drawing processing and comprises a first and second video buffers, comprising:

receiving a drawing instructions;

updating the display screen of said display element by each of said drawing elements only if none of said drawing elements is executing drawing processing at an update time predetermined for said display screen, displaying first image data, which has been accumulated, on said display element from said first video buffer while second image data is being accumulated in said second video buffer; and displaying said second image data on said display element from said second video buffer while third image data is being accumulated in said first video buffer.

17. A computer-usable storage medium having a computer program embodied thereon for causing a computer, which includes a plurality of drawing elements, each of which executes drawing processing and comprises a first and second video buffers, by performing the following steps when such program is executed on the computer:

receiving a drawing instruction;

updating the display screen of said display element by each of said drawing elements only if none of said drawing elements is executing drawing processing at an update time predetermined for said display screen;

displaying first image data, which has been accumulated, on said display element from said first video buffer while second image data is being accumulated in said second video buffer; and displaying said second image data on said display element from said second video buffer while third image data is being accumulated in said first video buffer.

* * * * *